(12) United States Patent
Stein et al.

(10) Patent No.: US 7,574,491 B2
(45) Date of Patent: Aug. 11, 2009

(54) VIRTUAL DATA CENTER FOR NETWORK RESOURCE MANAGEMENT

(75) Inventors: Lawrence Stein, San Carlos, CA (US);
Evan Bigall, Mountain View, CA (US);
Russell S Greer, Los Gatos, CA (US);
Gary Jaszewski, Los Gatos, CA (US);
Jared Oberhaus, Palo Alto, CA (US)

(73) Assignee: Scalent Systems, Palo Alto, CA (US)

( * ) Notice: Subject to any disclaimer, the term of this patent is extended or adjusted under 35 U.S.C. 154(b) by 519 days.

(21) Appl. No.: 11/193,602

(22) Filed: Jul. 29, 2005

(65) Prior Publication Data

US 2007/0027973 A1   Feb. 1, 2007

(51) Int. Cl.
*G06F 15/177* (2006.01)
*G06F 15/16* (2006.01)
*G06F 9/445* (2006.01)

(52) U.S. Cl. .............. 709/220; 709/222; 709/221; 709/217; 717/177; 713/2

(58) Field of Classification Search ............ 709/220, 709/222, 221, 217; 713/2; 717/177
See application file for complete search history.

(56) References Cited

U.S. PATENT DOCUMENTS

| | | | | |
|---|---|---|---|---|
| 7,080,378 B1 * | 7/2006 | Noland et al. | | 718/104 |
| 7,111,017 B1 * | 9/2006 | Forood et al. | | 707/104.1 |
| 7,120,787 B2 * | 10/2006 | Chu et al. | | 713/1 |
| 7,171,479 B2 * | 1/2007 | Buchanan et al. | | 709/228 |
| 7,178,059 B2 * | 2/2007 | Greenspan et al. | | 714/13 |
| 7,194,619 B2 * | 3/2007 | Abbondanzio et al. | | 713/155 |
| 7,213,065 B2 * | 5/2007 | Watt | | 709/223 |
| 7,356,679 B1 * | 4/2008 | Le et al. | | 713/1 |
| 7,448,034 B2 * | 11/2008 | Anderson et al. | | 717/176 |
| 2005/0055428 A1 * | 3/2005 | Terai et al. | | 709/220 |
| 2005/0091396 A1 | 4/2005 | Nilakantan | | |
| 2006/0004909 A1 * | 1/2006 | Takuwa et al. | | 709/203 |

* cited by examiner

*Primary Examiner*—Kevin Bates
(74) *Attorney, Agent, or Firm*—William L. Botjer

(57) ABSTRACT

A system and a method for implementing a virtual data center. In which, the functions to be performed by a computer, and the access the computer equipment is required to have to the storage and network facilities, are decoupled from the hardware, and instantiated dynamically on any suitable computer equipment, without any manual intervention. In a virtual data center, all the physical resources are virtualized and arranged dynamically, to meet the functional requirements of the data center.

17 Claims, 18 Drawing Sheets

VIRTUAL DATA CENTER FOR NETWORK RESOURCE MANAGEMENT

BACKGROUND

The present invention relates to the field of Data Center Systems (DCS). More specifically, it relates to a system and method for implementing a Virtual Data Center (VDC) system in a network of physical devices.

A computer network includes a plurality of network devices such as servers, firewalls, and other such appliances. Servers may be categorized as physical servers and virtual servers. Examples of physical servers include stand-alone and blade servers. Examples of virtual servers include servers created by systems that divide a physical server into one or more parts, each of which can host an independent operating environment. A server has a Network Interface Card (NIC) that connects the server to one or more Local Area Networks (LANs). The NIC has a unique Medium Access Control (MAC) address. The MAC address serves as an identifier of the server on a LAN. The present state of the art provides communications protocols, which use dynamic methods, e.g., Address Resolution Protocol (ARP), to map a higher-level identification of the server, e.g., the Internet Protocol (IP) address, as compared to the MAC address. The MAC address is used to communicate data to a server over a LAN, and is also used by some software vendors as a license key. When the NIC is changed, or the server function is moved to another server, the server loses its original MAC address-based identifier. As a result, the license may be invalidated, and the server unable to function until the network administrator manually provides a new MAC address. This often results in disruption of service.

Like an NIC, a Host Bus Adapter (HBA) connects the server to a Storage Area Network (SAN). A SAN is a network that provides access to data stored on disks or volumes, and is controlled by specialized equipment such as SAN switches and directors. Each HBA has a unique World-Wide Name (WWN), which serves as an identifier for a server on a SAN. However, if the server function moves to another server with its own HBA, or if the HBA on the server is changed, then the server may lose access to information on the SAN.

One type of information is a server image, which is required by the server to boot. The server image includes the operating system, operating system configuration data, the application software, the application configuration data, the LAN and SAN related configuration, and the LAN and SAN identities of the server. The server image required by the server may reside on a local disk of the server or on some remote storage devices. Typical examples of remote storage devices are Logical Units (LUNs) on a SAN, and a file system on Network Attached Storage (NAS) devices. NAS devices use the server's MAC address to select the server. Similarly, the SAN uses the WWN to establish a connection with the server. If the server hardware is replaced, or if the NIC or the HBA is changed, the server cannot boot without appropriate configuration changes made by the data center administrator. The process of reconfiguration is prone to errors and may result in interruption to the service, and permanent loss of critical data.

Existing methods reduce the effort and time involved in the creation and maintenance of server images by the data center administrator. However, these methods do not address the problems associated with LAN and SAN identity changes, caused by changes in the server hardware. Intervention by the data center administrator is still required, to address these problems.

Further, the servers may be organized into business systems or tiers in a DCS. Typical examples of business systems include Enterprise Resource Planning (ERP), Customer Relationship Management (CRM), financial, trading, retail, and so forth. The servers are functionally grouped into tiers—the web tier, the application tier, the data base tier, and so forth. In the absence of a method for organizing the servers dynamically, data center administrators have to provision each tier or business system for anticipated peak utilization. This results in an exponential increase in the number of server resources, as well as in the management, and the operational cost and complexity.

SUMMARY

An objective of the invention is to dynamically allocate server images (or boot images) to servers in a Data Center System (DCS).

A second objective of the invention is to dynamically provision network connectivity properties and storage access properties for servers in a DCS.

A third objective of the invention is to automatically detect a server failure and dynamically provide a substitute server in the event of server failure in a DCS.

A fourth objective of the invention is to transparently allocate server images among various types of physical and virtual servers.

A fifth objective of the invention is to provide a common, and protocol agnostic, mechanism for communicating with the physical devices of the DCS when no operating system is running on the devices.

A Virtual Data Center (VDC) system that decouples the software environment, and the functionalities linked to access to SAN and LAN, from the hardware of the server is provided. This provides a method, which dynamically configures server images and allocates the required server image to the server.

A VDC system includes a network of servers, a layer 2 interconnect fabric, a controller, an agent, and a system management infrastructure. Each server in the network of servers requires a server image to boot. The required server image may be stored on a local disk on the server or on a remote storage device. The layer 2 interconnect fabric includes ports, which provide connectivity to the network of servers. The controller configures and assigns server images to the servers dynamically. The agent resides on each of the plurality of servers and enables communication between the controller and the VDC system.

In various embodiments of the invention, in order to mange the VDC system, the controller configures the server images dynamically. When a server requires a server image to boot, it makes a request to the controller for a server image to be assigned. The controller allocates a suitable server image to the server, which boots, using the allocated server image.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF PREFERRED EMBODIMENTS

Various embodiments of the present invention provide a system and a method to implement a Virtual Data Center (VDC) system in a network of physical devices. The VDC system decouples the software environment and the functionalities linked to the access of Storage Area Network (SAN) and Local Area Network (LAN) from the hardware of the physical devices. This facilitates a dynamic configuration of the server images and the allocation of the required server image to the server.

In various embodiments of the invention, the physical devices may be stand-alone servers, virtual servers, virtual racks, chassis, and so forth. For various embodiments of the invention, the terms 'server' and 'physical device' may be used interchangeably.

Figure 1:
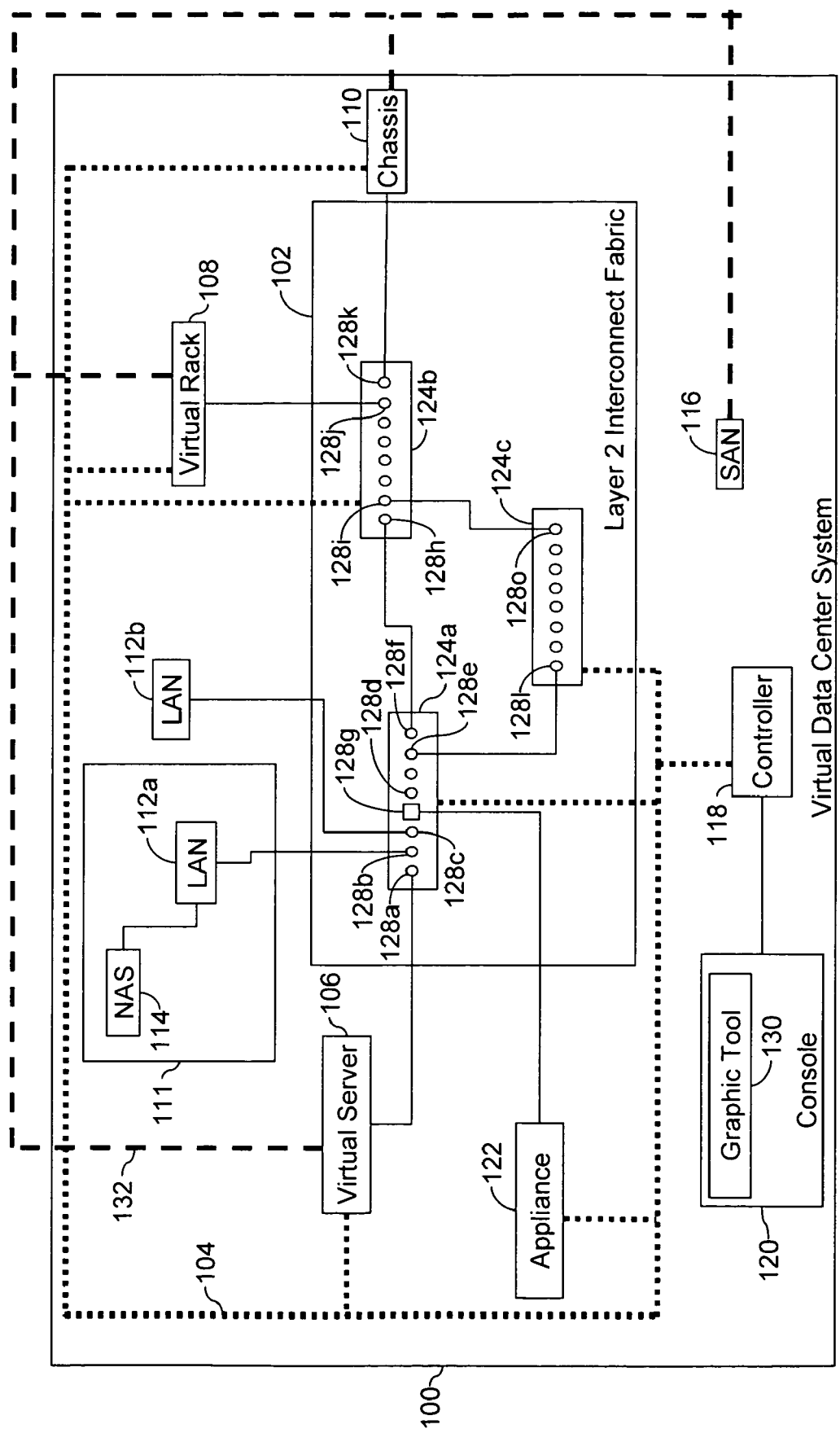
FIG. 1 illustrates a Virtual Data Center (VDC) system, in accordance with an embodiment of the invention.

FIG. 1 illustrates a Virtual Data Center (VDC) system 100, in accordance with an embodiment of the invention. VDC system 100 includes a layer 2 interconnect fabric 102 and a system management infrastructure 104. VDC system 100 also includes a virtual server 106, a virtual rack 108, a chassis 110, a net-boot network 111 comprising a Local Area Network (LAN) 112a and a Network Attached Storage (NAS) device 114, an external network (not shown in the figure) comprising a LAN 112b, and a SAN 116. VDC system 100 also includes a controller 118, a console 120, and a network appliance 122, hereinafter referred to as an appliance 122. In various embodiments of the invention, appliance 122 includes a load balancer such as an F5 box. Virtual server 106, virtual rack 108, and chassis 110 will be, hereinafter, collectively referred to as physical devices. Alternate embodiments of the invention may include a plurality of the following: virtual server 106, virtual rack 108, chassis 110, external, controller 118, and appliance 122.

In accordance with an embodiment of the present invention, Layer 2 interconnect fabric 102 includes a plurality of Ethernet switches, connected in a mesh configuration. Each of the plurality of Ethernet switches includes a plurality of ports. For example, in VDC system 100, layer 2 interconnect fabric 102 includes switch 124a, switch 124b, and switch 124c. Switch 124a includes port 128a, port 128b, port 128c, port 128d, port 128e, port 128f, and port 128g. Similarly, switch 124b includes port 128h, port 128i, port 128j, and 128k. Switch 124c also includes port 128l and port 128o. Further, port 128e is connected to port 128l, port 128f to port 128h, and port 128i to port 128o, which connect switch 124a to switch 124c, switch 124a to switch 124b, and switch 124c to switch 124b, respectively. In various embodiments of the invention, a switch may include more than eight ports.

Physical devices in VDC system 100 connect to layer 2 interconnect fabric 102 through ports 128 of switches 124. This interconnection facilitates the dynamic configuration and management of VDC system 100. For example, virtual server 106 is connected to layer 2 interconnect fabric 102 through port 128a of switch 124a. Virtual rack 108 and chassis 110 are connected to layer 2 interconnect fabric 102 through port 128j and port 128k of switch 124b, respectively. Moreover, appliance 122, LAN 112a and LAN 112b connect to layer 2 interconnect fabric 102 through port 128g, port 128b and port 128c of switch 124a, respectively.

Physical devices in VDC system 100 are also connected to a SAN 116 through a storage access network 132. SAN 116 provides access to data stored on remote disks that are managed by specialized equipment not shown in FIG. 1. Storage access network 132 is enabled by using a Fiber Channel network. In an embodiment of the invention, the Fiber Channel network is a physical network, which is not a part of layer 2 interconnect fabric 102. Further, the physical devices have fiber channel cards installed on them, known as Host Bus Adaptors (HBAs). The HBAs enable connectivity between the physical devices and SAN 116, and are connected to a switch on SAN 116 through a fiber optic cable. The switch on SAN 116 is connected to an array of hard drives. In an embodiment, the physical devices have more than one HBA installed on them.

In an alternate embodiment of the invention, SAN 116 is connected via a port on switch 124 on layer 2 interconnect fabric 102.

In various embodiments of the invention, console 120 includes a graphic tool 130. Graphical tool 130 facilitates network configuration and other infrastructure-related operations. Examples of such operations include, but are not limited to, establishing the network topology, creating copies of server images, configuring server selection criteria, and configuring the LAN and SAN connectivity attributes for server images. Console 120 is also connected to controller 118.

Figure 6:
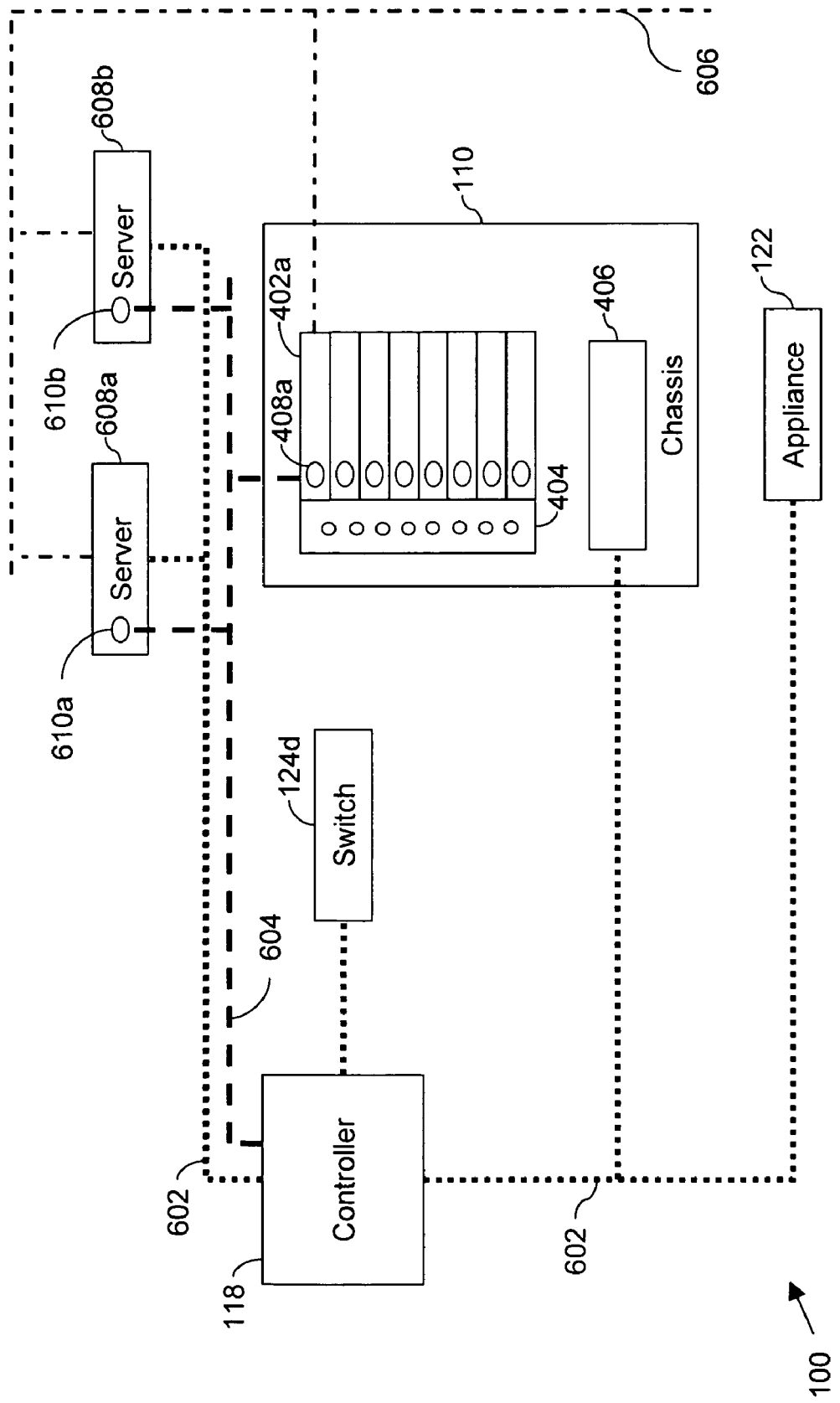
FIG. 6 illustrates the control networks in the VDC system, in accordance with an embodiment of the invention.

System management infrastructure 104 enables controller 118 to communicate with the physical devices, switches 124, and appliance 122. System management infrastructure 104 includes remote management interfaces that facilitate the power and reboot management of the physical devices in an Operating System (OS)-absent state. Examples of system management infrastructure 104 include chassis management modules, Integrate Lights Out (ILO) management interfaces, Intelligent Platform Management Interface (IPMI) interfaces, and so forth. FIG. 6 provides more details about system management infrastructure 104.

In various embodiments of the invention, controller 118 may be an electronic device such as a computer, which runs specialized software to manage and monitor VDC system 100. Controller 118 dynamically configures server images and assigns a server image to a physical device. Controller 118 abstracts the hardware related attributes, network related attributes and the storage access-related attributes associated with the server images, and stores them separately in a database. This database resides in controller 118 (further details are provided in FIG. 5). Controller 118 uses this data to dynamically allocate server images to a physical device.

Console 120 provides an interface to the data center administrator, to interact with controller 118. In an embodiment of the invention, console 120 may run on a general-purpose computer. Console 120 may include a graphic tool or a programmatic interface, for the data center administrator to interact with controller 118. For example, in VDC system 100, console 120 includes a graphic tool 130.

In VDC system 100, a plurality of external appliances may be connected to layer 2 interconnect fabric 102. These external appliances are managed by controller 118 as a part of VDC system 100. A data center administrator may allocate some plurality of ports 128 for such external appliances. For example, in VDC system 100, appliance 122 is connected to layer 2 interconnect fabric 102 through port 128g. Appliance 122 is equipment used in the DCS topology, to perform specific functions such as that of a firewall, load balancing, and so forth.

Figure 2:
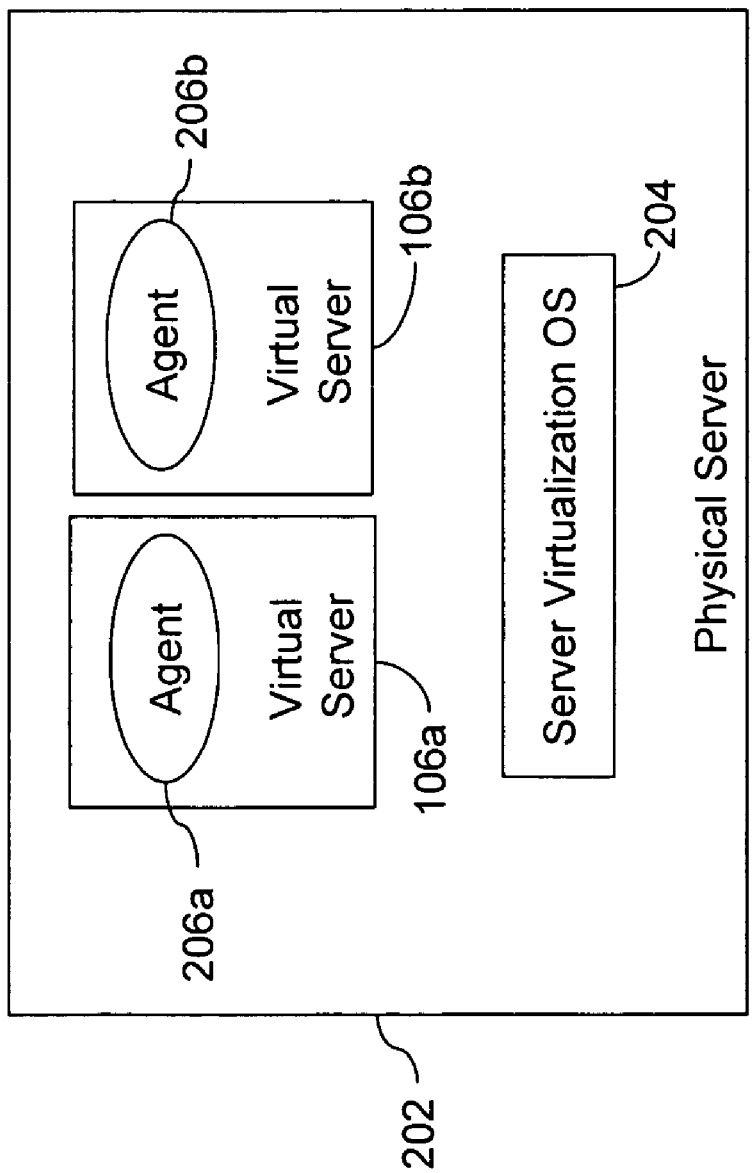
FIG. 2 is a block diagram illustrating a virtual server in a physical server, in accordance with an embodiment of the invention.

FIG. 2 is a block diagram illustrating virtual server 106 in a physical server 202, in accordance with an embodiment of the invention. Virtual server 106 runs in a virtual machine that resides on physical server 202. In an embodiment, physical server 202 may be a stand-alone server, a virtual rack or a chassis, which includes blade servers. Virtual server 106 is controlled by a server virtualization operating system 204 such as VMWare, Microsoft Virtual Server, Xen, and so forth. Virtual server 106 further includes an agent 206. Agent 206 is an application program that communicates with controller 118 to receive instructions from controller 118 for virtual server 106, and acts on directives issued by controller 118. Agent 206 also reports the status of virtual server 106 to controller 118 periodically. For example, virtual server 106a and virtual server 106b include agent 206a and agent 206b respectively.

Figure 3:
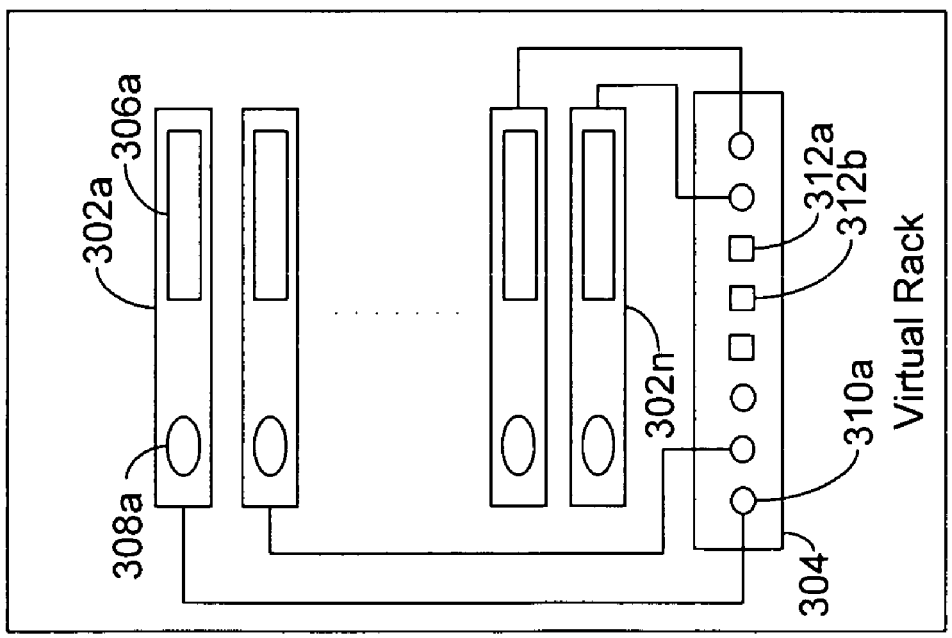
FIG. 3 is a block diagram illustrating a virtual rack, in accordance with an embodiment of the invention.

FIG. 3 is a block diagram illustrating virtual rack 108, in accordance with an embodiment of the invention. In various embodiments of the invention, a plurality of stand-alone servers 302a to 302n, hereinafter referred to as stand-alone servers 302, may be organized in virtual rack 108. Stand-alone server 302 may be defined as, but is not limited to, a server that has its own memory and processing attributes. Stand-alone servers 302 of virtual rack 108 are connected to layer 2 interconnect fabric 102 by means of the ports on a switch 304. Virtual rack 108 may be compared to a physical rack. The ports on switch 304 act like the slots of a physical rack. Stand-alone servers 302 occupy the ports of switch 304 that are similar to the slots in a physical rack. Each stand-alone server 302 also includes a remote management Network Interface Card (NIC) 306 and an agent 308. For example, a stand-alone server 302a includes a remote management NIC 306a and an agent 308a. Further, switch 304 includes a plurality of ports 310 and a plurality of ports 312. Ports 312 are reserved for providing connectivity to external appliances. Ports 310 provide connectivity to each stand-alone server 302. For example, port 310a provides connectivity to stand-alone server 302a. Remote management NIC 306 connects stand-alone server 302 to system management infrastructure 104. The functionality of agents 308 is similar to that of agents 206. Agents 308 receive instructions from controller 118 for stand-alone servers 302, and act on directives issued by controller 118.

Figure 4:
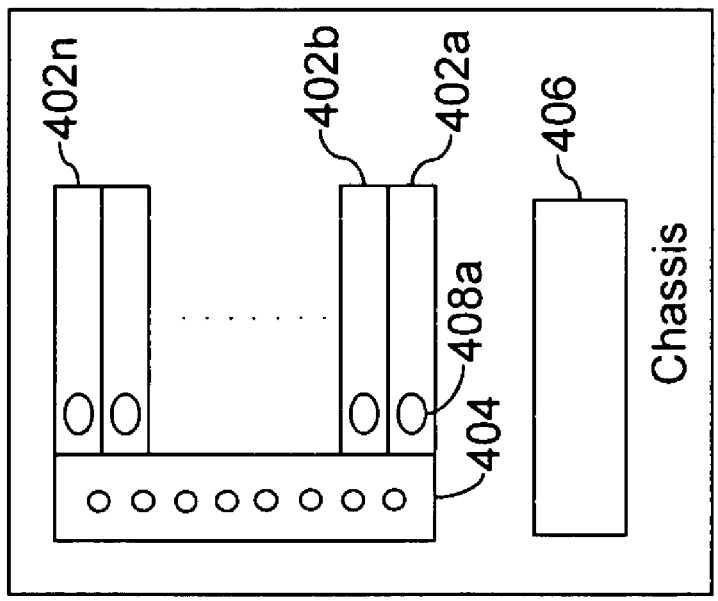
FIG. 4 is a block diagram illustrating a chassis, which encloses a plurality of blade servers, in accordance with an embodiment of the invention.

FIG. 4 is a block diagram illustrating chassis 110, in accordance with an embodiment of the invention. Chassis 110 may include a plurality of blade servers 402a to 402n, hereinafter referred to as blade server 402. Chassis 110 further includes a plurality of integrated switches 404, hereinafter referred to as switch 404, and a management module 406. Each blade server 402 further includes an agent 408. For example, blade server 402a includes an agent 408a. In various embodiments of the invention, switch 404 connects blade server 402a to layer 2 interconnect fabric 102. Management module 406 connects to system management infrastructure 104 for communication with controller 118. Management module 406 further facilitates communication with each blade server 402 across a proprietary back-plane connection.

In various embodiments of the invention, virtual server 106, each stand-alone server 302 in virtual rack 108, and each blade server 402 in chassis 110 is assigned a plurality of virtual MAC addresses and/or a plurality of virtual WWNs. The virtual MAC address and the virtual WWNs may be defined as, but are not limited to, addresses assigned dynamically to a device, to link it to a LAN and a SAN, respectively. The WWN and MAC addresses are virtual in the sense that they are stored in a database along with the abstracted server images. The virtual nature of a MAC address and a WWN makes these addresses hardware-independent and also enables dynamic assignment to the physical device. Details about the use of a virtual MAC address and a virtual WWN are provided from FIGS. 8 to 12.

Figure 5:
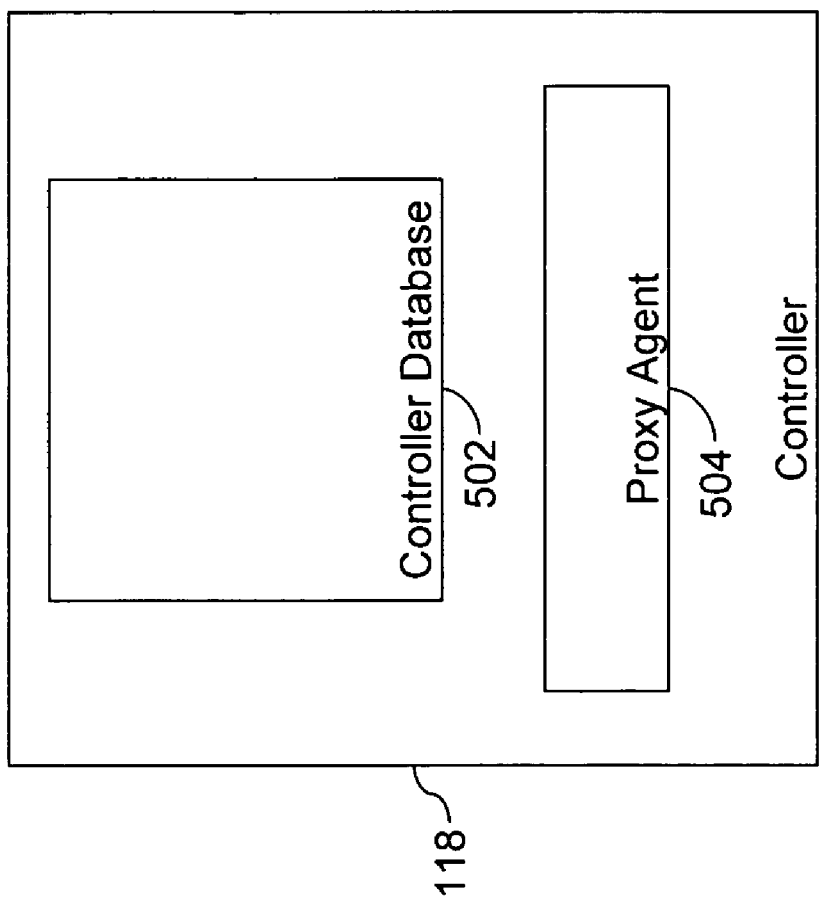
FIG. 5 is a block diagram illustrating a controller, in accordance with an embodiment of the invention.

FIG. 5 is a block diagram illustrating controller 118, in accordance with an embodiment of the invention. Controller 118 includes a controller database 502 and a proxy agent 504. Controller 118 abstracts the server images and stores them in controller database 502. In various embodiments of the invention, there are different types of attributes associated with the server images, i.e., hardware-related, network connectivity-related and storage access-related attributes. Examples of hardware-related attributes include the type of computer, the amount of memory, the amount of disk, the type and number of processors, and so forth. Examples of network connectivity-related attributes include the type of physical NICs, the number of physical NICs, the IP addresses of NICs, and so forth. Examples of SAN access-related attributes include the type and number of SAN HBAs, the WWN of HBAs, and so forth. In an embodiment of the invention, controller 118 abstracts hardware attributes associated with the server images and the attributes associated with access to LAN and SAN, and stores them in controller database 502. Controller 118 creates and assigns a unique server image identifier to each of the abstracted server images. The unique server image identifier is used to identify an abstracted server image and its associated attributes (e.g., network paths, virtual WWN and hardware requirements). In an embodiment, the abstracted server images are called personas, which may be stored in controller database 502, as follows:

EXAMPLE 1

| | |
|---|---|
| <persona id="5" netboot="yes"> | (1) |
|   <requiredHardware min="mediumMemory" max="any" preferred="largeMemory"/> | (2) |
|   <image path="192.168.0.1:/images/apache" .../> | (3) |
| </persona> | |

In example 1, command line (1) states that the unique server image identifier is '5' and the server image requires a net boot. Command line (2) states the hardware attributes associated with the server image, i.e., it requires at least a medium memory and prefers a large memory. Command line (3) states the network connectivity-related attributes, i.e., the path where the image has been stored.

EXAMPLE 2

```
<persona id="6" san="yes">                                        (1)
    <requiredHardware min="any" max="any" preferred="any"/>        (2)
    <image virtual_wwn="dwhfec93j".../>                            (3)
</persona>
```

In example 2, command line (1) states that the unique server image identifier is '6', and the server image requires a SAN boot. Command line (2) states the hardware attributes associated with the server image, i.e., it has no memory specifications and will work with any available memory size. Command line (3) states the network connectivity-related attributes, i.e., the WWN of the SAN, where the image is stored.

Proxy agent 504 enables controller 118 to establish a communication link with external appliances such as appliance 122, interconnect switches such as switches 124, and remote management NICs on stand-alone or virtual rack servers such as remote management NIC 306 on stand-alone server 302. Controller 118 configures appliance 122, using proxy agent 504. Proxy agent 504 configures the load balancer to incorporate the required persona into the load-balancing pool of the load balancer. Proxy agent 504 also enables appliance 122 to appear in the topology of VDC system 100. In an embodiment of the invention, a data center administrator can draw a virtual cable connecting a persona (e.g., an Apache web server) to the load balancer, which may be represented by a proxy agent 504 in the topology of VDC system 100.

FIG. 6 illustrates the control networks in VDC system 100, in accordance with an embodiment of the invention. VDC system 100 includes three control networks—a system management network 602, a boot network 604, and a system control network 606. The control networks are instantiated dynamically on layer 2 interconnect fabric 102. In an embodiment of the invention, the control networks are logical networks, which may be on the same physical LAN. In another embodiment, each of the control networks may be instantiated on separate physical LANs.

System management network 602 connects controller 118 to each of servers 608, a switch 124d, chassis 110 and appliance 122. Servers 608 and switch 124d are directly connected to controller 118 via system management infrastructure 104. Switch 124d connects to system management network 602 by using a port that is dedicated for remote management. Controller 118 connects to blade server 402 in chassis 110 through management module 406. In various embodiments of the invention, blade server 402 may not support a remote management interface. Therefore, management module 406 connects to system management network 602 through a dedicated remote management port. Management module 406 further facilitates communication with blade server 402 across a proprietary back-plane connection. In an embodiment, controller 118 connects to appliance 122 through proxy agent 504 (shown in FIG. 5).

A variety of communication protocols, such as ILO, IPMI, SNMP, SSL, and so forth, are used on system management infrastructure 104 between controller 118 and the various devices it manages.

Boot network 604 is a default network to which each of the physical devices connects before being allocated a server image. Boot network 604 also enables server discovery. Further, boot network 604 enables booting of a physical device, if the physical device is configured to boot over the network and not from a local disk.

System control network 606 provides communication between each of the physical devices and controller 118, when the physical devices are in the OS-present mode. The communication on system control network 606 takes place between controller 118 and agents 610 and agents 408. In one embodiment of the invention, a secure communication protocol, such as Secure Socket Layer (SSL), is used on system control network 606.

Figure 7:
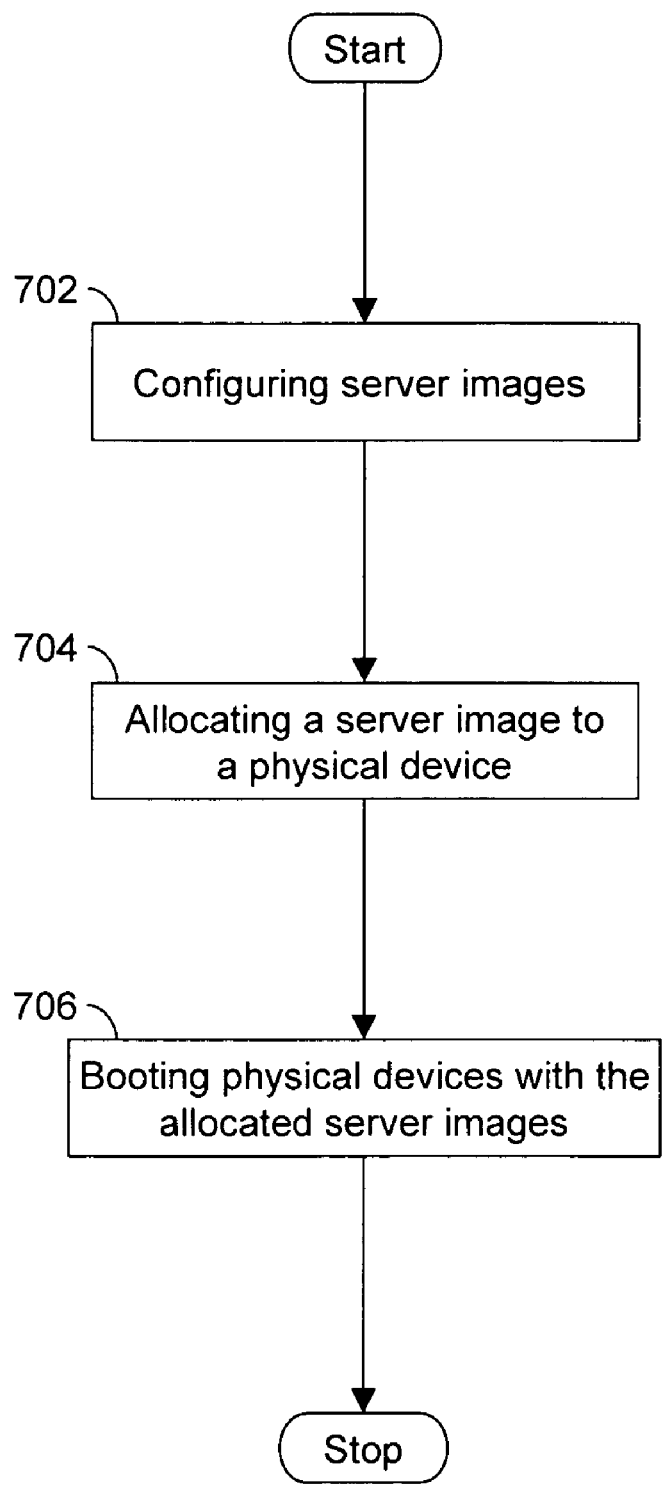
FIG. 7 is a flowchart depicting a method for managing the VDC system, in accordance with an embodiment of the invention.

FIG. 7 is a flowchart depicting a method for managing VDC system 100, in accordance with an embodiment of the invention. At step 702, controller 118 configures server images. At step 704, controller 118 allocates a suitable server image to the physical device. At step 706, the physical device is booted by using the allocated server images. The details of the operations used to manage VDC system 100 are described in FIG. 8 to FIG. 13.

Figure 8:
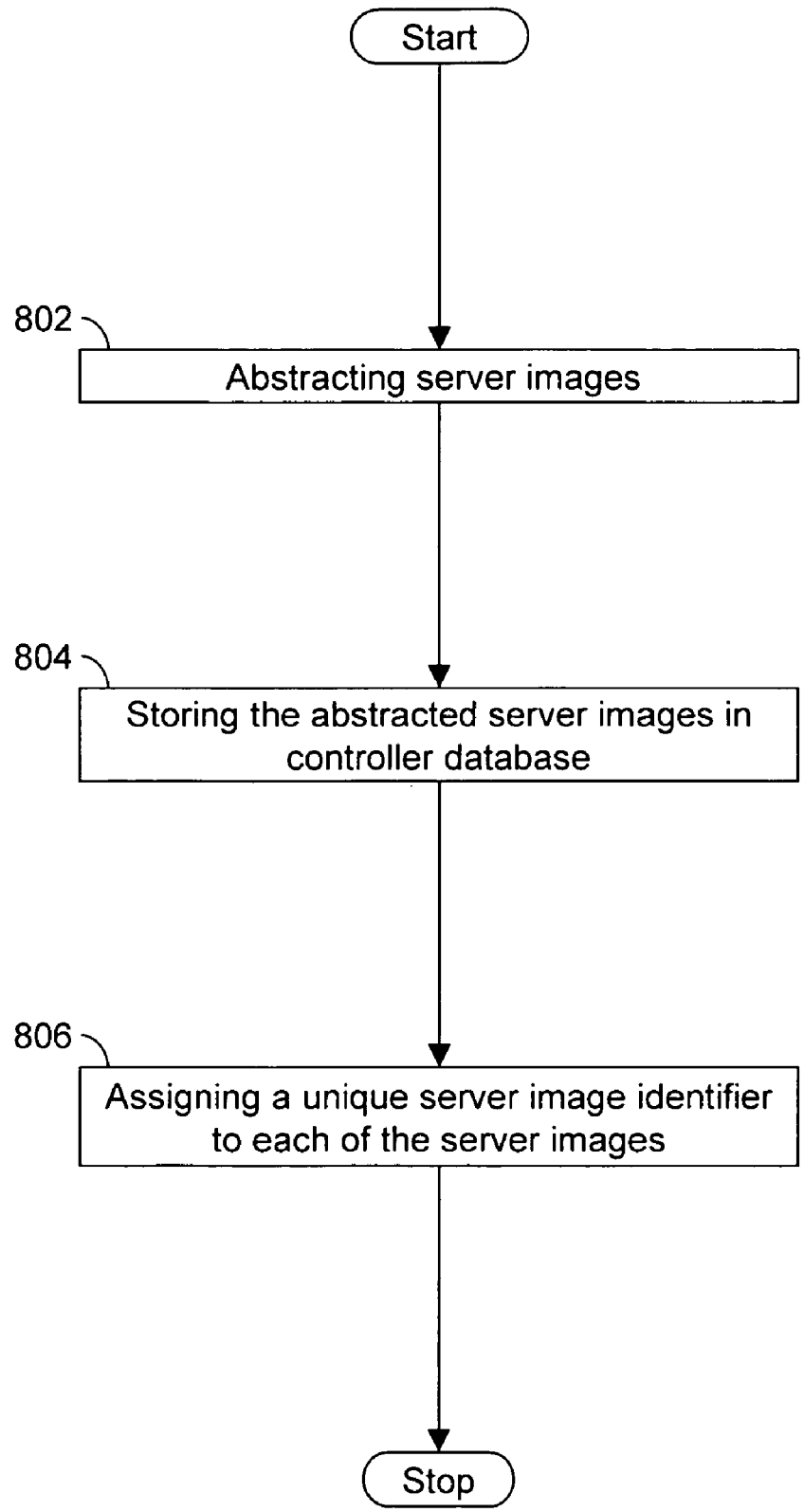
FIG. 8 is a flowchart depicting a method for configuring the VDC system, in accordance with an embodiment of the invention.

FIG. 8 is a flowchart depicting a method for configuring VDC system 100, in accordance with an embodiment of the invention. The method includes the steps of abstracting and storing the abstracted information separately. This enables decoupling of the software environment, and the functionalities linked to the access of the storage devices and those linked to the hardware attributes of the physical devices.

At step 802, controller 118 abstracts the server images. The abstraction of server images includes separating the hardware related, network connectivity related and storage access-related attributes associated with the server images. At step 804, controller 118 stores the abstracted server images in controller database 502. At step 806, controller 118 assigns a unique server image identifier to the server images. Controller database 502 may reside on a disk that is directly attached to controller 118, a SAN-attached disk, or on a disk under the control of a network file server.

Abstracting hardware-related attributes associated with the server image includes abstracting attributes associated with the type of computer, the amount of memory, the number of disk, the type and number of processors, and so forth. Abstracting network connectivity-related atributes includes abstracting the attributes associated with the NICs. Abstracting storage access-related attributes includes abstracting the attributes associated with the HBAs.

The abstracted server images are allocated to a suitable physical device by matching the hardware attributes associated with the server images with the attributes associated with the physical device. The allocation is also governed by the overall functional design of the data center, the server requirements of the server image, and the server assignment policies instituted by the data center administrator.

Figure 9A:
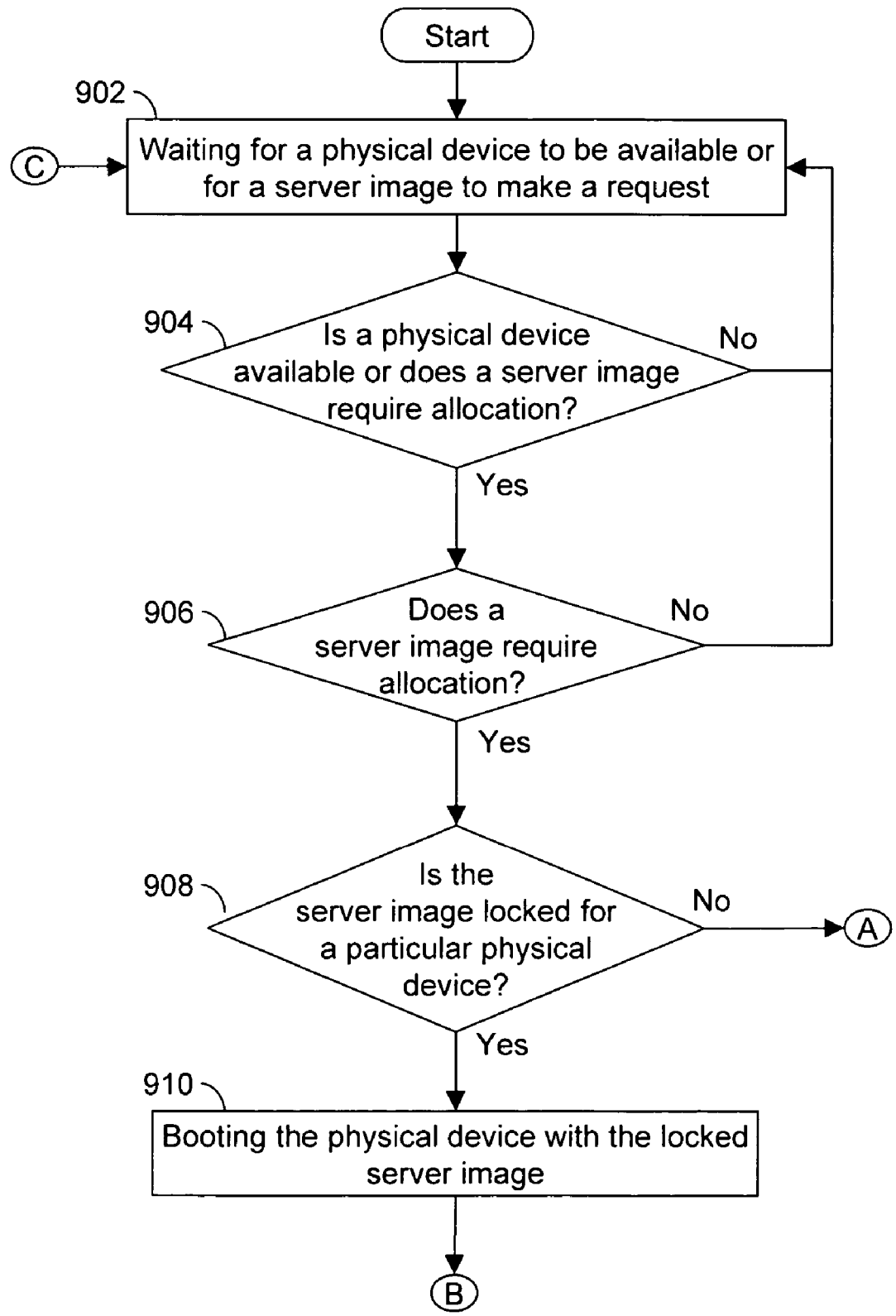
FIGS. 9A and 9B represent a flowchart depicting a method for allocating a server image to a server, in accordance with an embodiment of the invention.
Figure 9B:
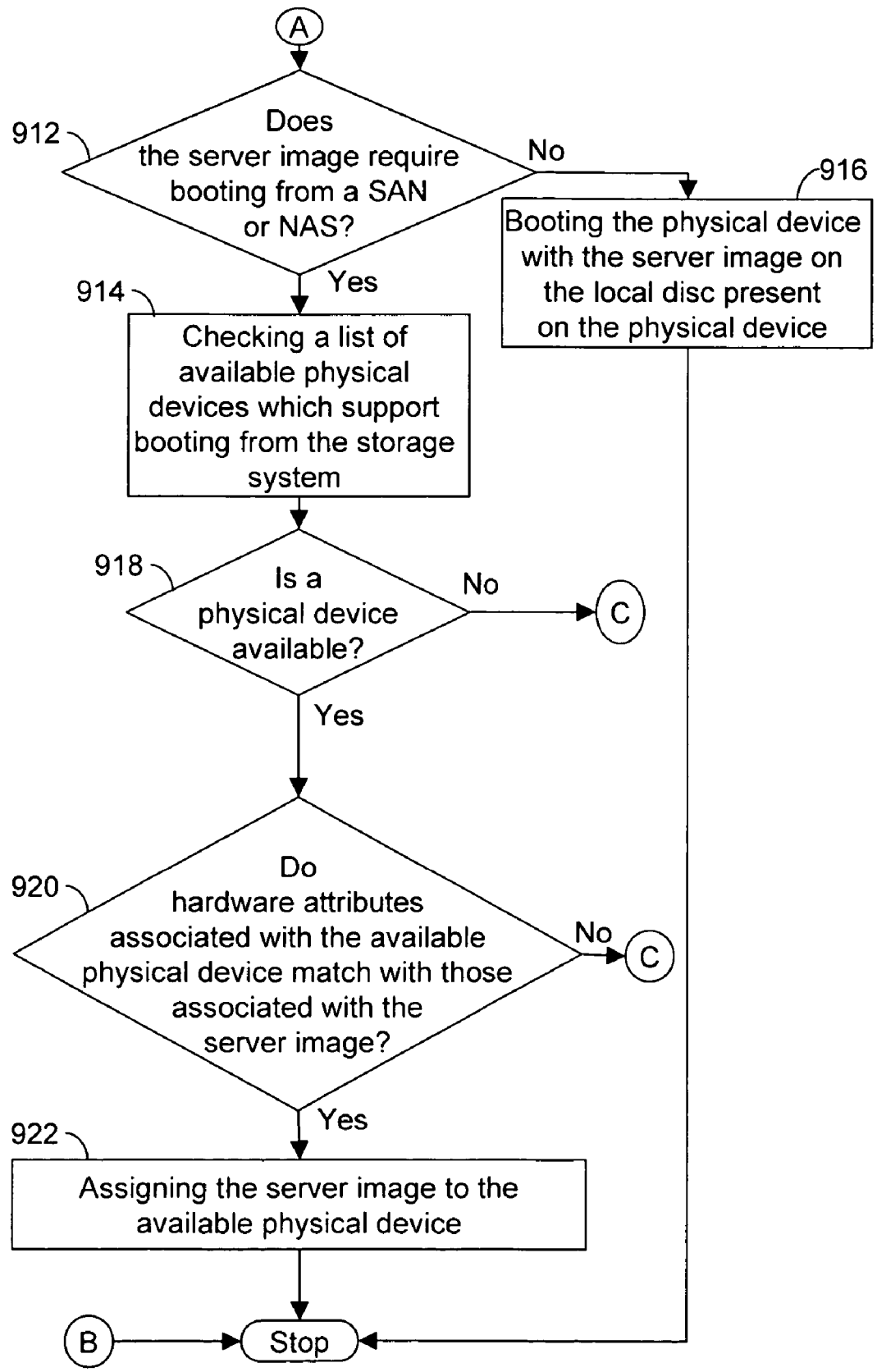

FIGS. 9A and 9B represent a flowchart depicting a method for allocating a server image to a physical device, in accordance with an embodiment of the invention. At step 902, controller 118 waits or does not perform any action until a physical device is available, or until a server image makes a request. A physical device is available when it does not have any assigned server image, and waits for controller 118 to assign a suitable server image. The server image makes a request to controller 118, so that it is allocated to a physical device. At step 904, controller 118 checks whether a physical device is available or if a server image requires allocation. If a physical device is available, or if a server image requires allocation, step 906 is performed. Otherwise, step 902 is performed. At step 906, controller 118 checks whether a server image requires allocation. If it does, step 908 is performed. Otherwise, step 902 is performed. At step 908, controller 118 checks whether the server image is locked for a particular physical device. If it is, step 910 is performed. Otherwise, step 912 is performed. At step 910, the physical device is booted with the locked server image.

At step 912, controller 118 checks whether the server image requires booting from a SAN or a NAS. If the server image requires booting from a SAN or a NAS, step 914 is performed. Otherwise, step 916 is performed. At step 916, the physical device is booted with a server image on the local disk present on the physical device. At step 914, controller 118 checks a list of available physical devices, which require booting from a SAN or NAS.

The list of available physical device includes the list of physical servers, which meet the booting requirements of a server image. The list is derived from the system configuration file that is stored in controller database 502. Controller 118 reads the system configuration file and extracts all the possible physical servers from it. Controller 118 then filters the list, and retains only those physical servers that match the booting requirements of the server image.

In an embodiment, the list of servers kept in controller database 502 may be represented as:

```
LIST:
{
  <physicalServer id="BL_1" san="yes" netboot="no" .../>   (1)
  <physicalServer id="BL_2" san="no" netboot="yes" .../>   (2)
  <physicalServer id="BL_3" san="no" netboot="no" .../>    (3)
  <physicalServer id="BL_4" san="no" netboot="yes" .../>   (4)
}
```

Command line (1) states that the unique server identifier of the server is 'BL 1'; the server supports a SAN boot but not a NAS boot. Similarly, command line (2) states that the unique server identifier of the server is 'BL 2'; the server does not support a SAN boot and supports a NAS boot. The list includes four servers with their unique server identifiers and the specifications about the type of booting that they support.

If a server image requires a net boot at step 914, the following list will be generated:

```
LIST
{
  <physicalServer id="BL_2" san="no" netboot="yes" .../>
  <physicalServer id="BL_4" san="no" netboot="yes" .../>
}
```

At step 918, if a physical device is found to be available, step 920 is performed. Otherwise, step 902 is performed. At step 920, controller 118 matches the hardware attributes associated with the available physical device in the list with the attributes associated with the server image. If the hardware attributes of the available physical device in the list match those associated with the server image, step 922 is performed, or else, step 902 is performed. At step 922, controller 118 assigns the server image with the matching attributes to the available physical device. When a suitable server image is allocated to the physical device, it boots by using the allocated server image.

Figure 10A:
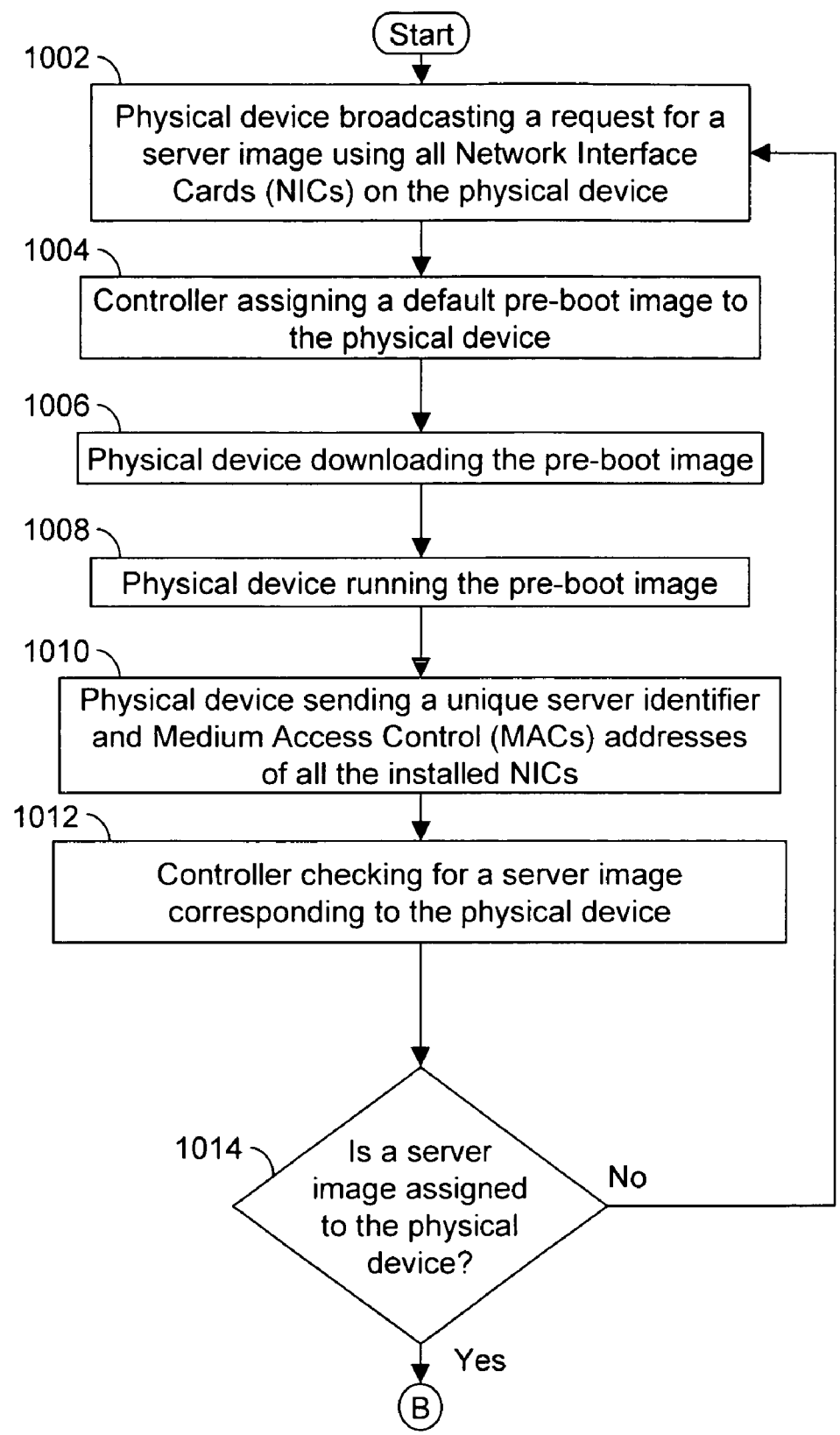
FIGS. 10A and 10B represent a flowchart depicting a method for booting servers, in accordance with an embodiment of the invention.
Figure 10B:
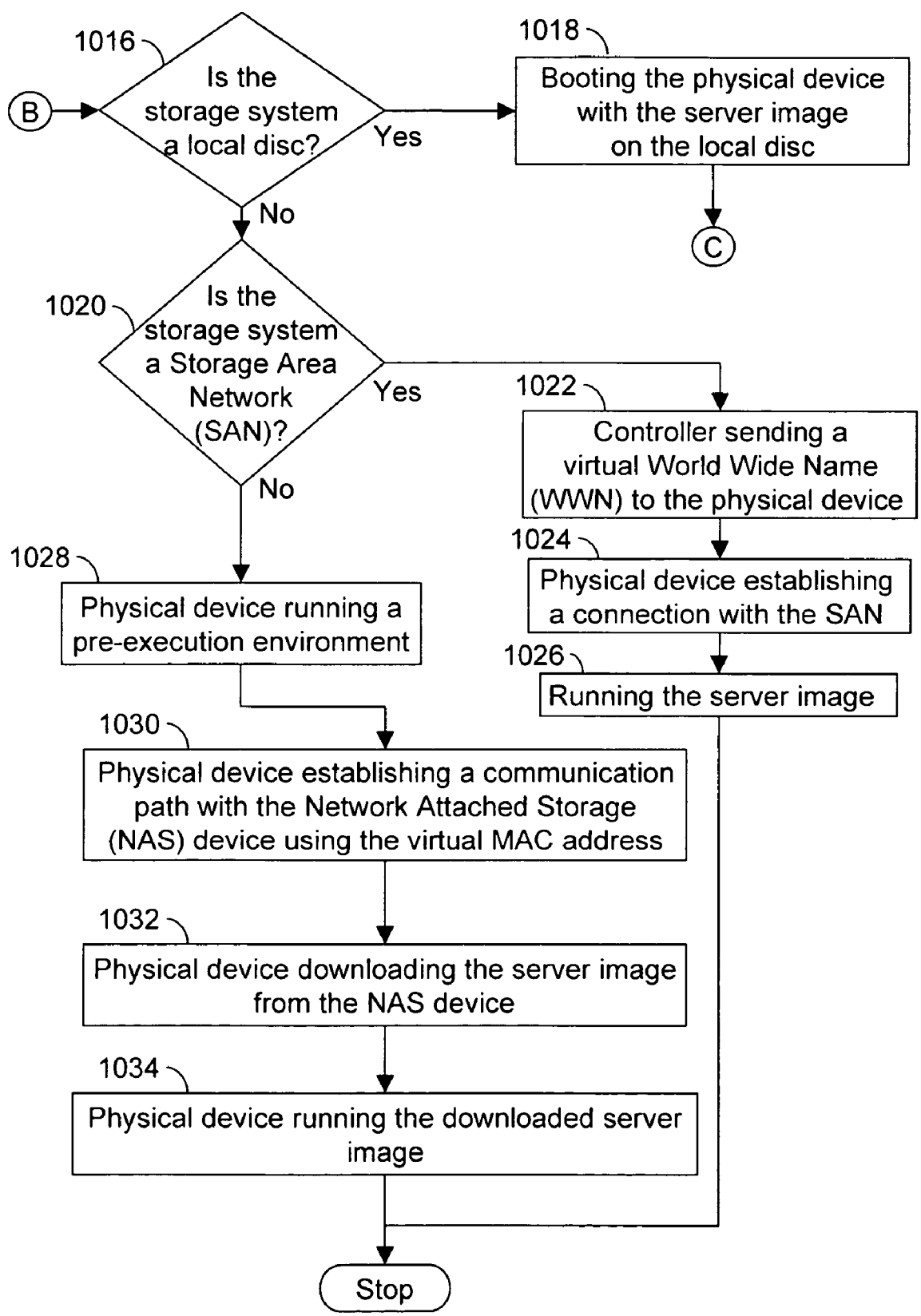

FIGS. 10A and 10B represent a flowchart depicting a method for booting a physical device, in accordance with an embodiment of the invention. At step 1002, a request for a server image is broadcast to controller 118 by a physical device. The request is made by using all the installed Network Interface Cards (NICs) on the physical device. At step 1004, a default pre-boot image is assigned by controller 118 to the physical device broadcasting the request. At step 1006, physical device downloads the pre-boot image. At step 1008, physical device runs the downloaded pre-boot image.

At step 1010, the physical device sends a unique server identifier and the Medium Access Control (MAC) addresses of all the installed NICs to controller 118. A unique server identifier is associated with each of the physical devices. In an embodiment, the unique server identifier may be the Central Processing Unit (CPU) serial number of the physical device. The unique server identifier associated, the Medium Access Control (MAC) addresses of all installed NICs, and the physical attributes associated with the physical devices are stored in controller database 502. In an embodiment controller database 502 may store the same as given in the example below:

```
<server id="HOST_4619" cpus="2" memory="4GB" ...>   (1)
<server id="HOST_8241" cpus="1" memory="1GB" ...>   (2)
```

Command line (1) states that the unique server identifier is 'HOST 4619', the server has two CPUs, and the associated memory is 4 GB. Similarly, command line (2) states that the unique server identifier is 'HOST 8241'; the server has one CPU, and the associated memory is 1 GB.

At step 1012, controller 118 checks whether a server image is assigned to a physical device. At step 1014, if a server image is assigned to the physical device, step 1016 is performed, otherwise step 1002 is performed. At step 1016, controller 118 checks whether the storage system is a local disk. If the storage system is a local disk, step 1018 is performed. Otherwise, step 1020 is performed. At step 1018, the physical device boots with the assigned server image present on a local disk of the physical device.

At step 1020, controller 118 checks whether the storage system is a SAN. If it is, step 1022 is performed. Otherwise step 1028 is performed. At step 1022, controller 118 sends a virtual World Wide Name (WWN) to the physical device. The WWN is referred to as a virtual WWN, since it is stored along with the abstracted server image in controller database 502. This allows dynamic assigning of the WWN to different physical devices. The virtual WWN is used by the physical device to establish a connection with the SAN. At step 1024, the physical device establishes a connection with the server image on the SAN. At step 1026, the physical device runs the server image.

If at step 1020 the storage system is not a SAN, at step 1028, the physical device runs a pre-execution environment residing on the physical device. At step 1030, the physical device establishes a communication path with the Network Attached Storage (NAS) device by using the virtual MAC address, which is stored in controller database 502, along with the abstracted server image. The server image of the physical device resides on the NAS device. At step 1032, the physical device downloads the server image from the NAS device. At step 1034, the physical device runs the downloaded server image.

Figure 11A:
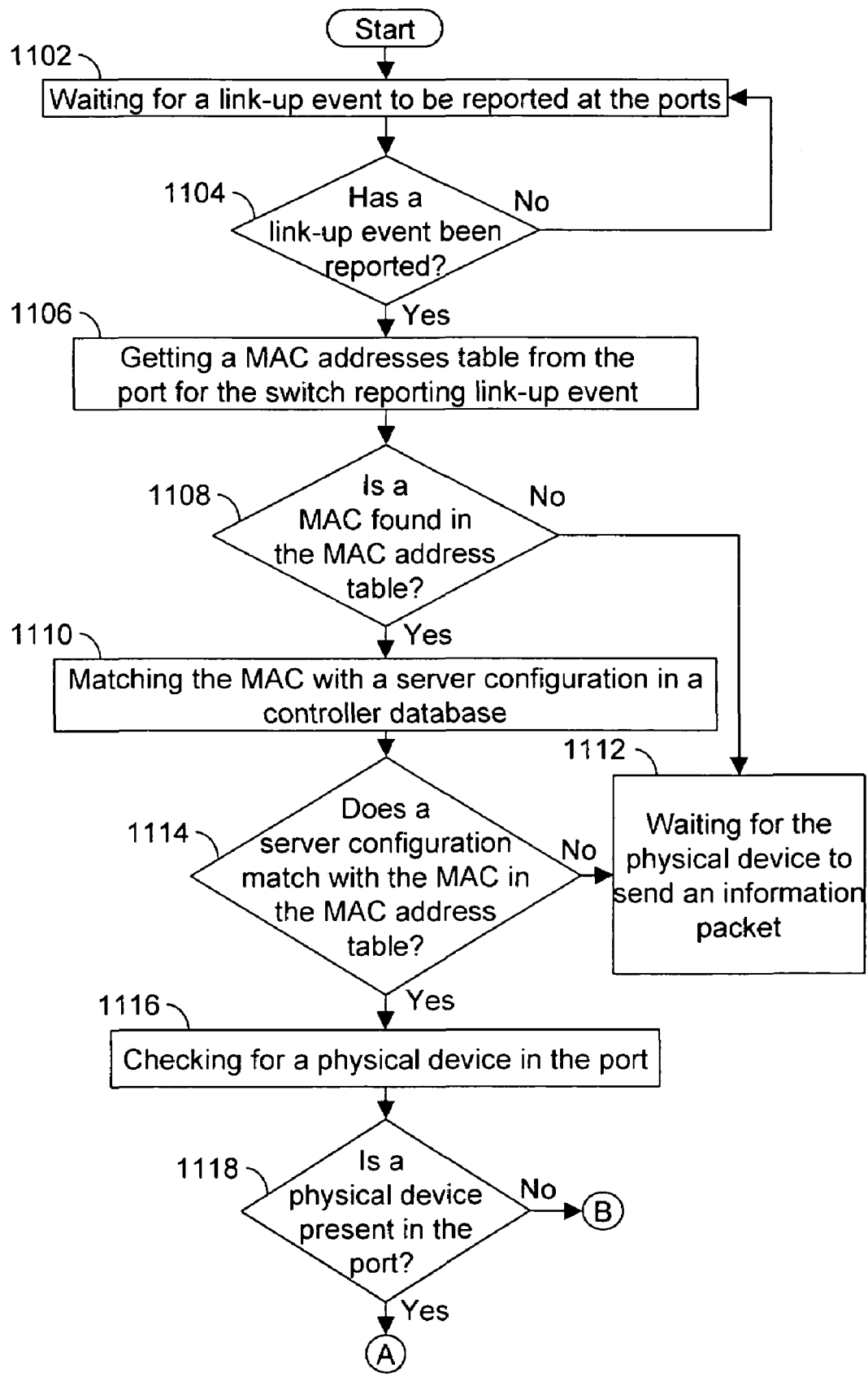
FIGS. 11A and 11B represent a flowchart depicting a method for tracking the movement of servers across ports, in accordance with an embodiment of the invention.
Figure 11B:
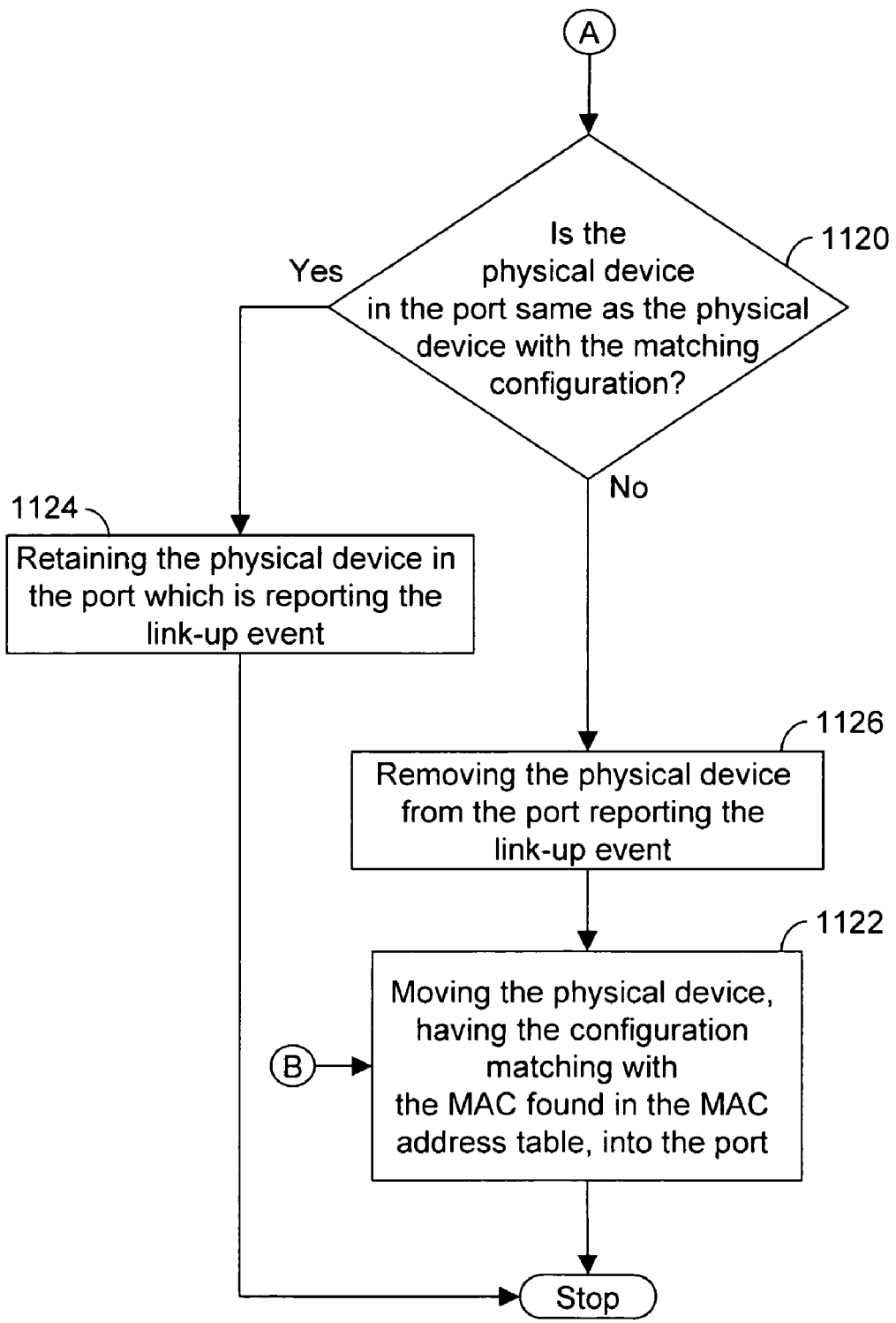

FIGS. 11A and 11B represent a flowchart depicting a method for tracking the movement of a physical device across plurality of ports 128, in accordance with an embodiment of the invention. At step 1102, controller 118 waits for a link-up event to be reported at one of plurality of ports 128. At step 1104, if a link-up event is reported at one of plurality of ports 128, step 1106 is performed. Otherwise, step 1102 is performed. At step 1106, controller 118 gets a MAC address table from a switch, which includes the port reporting the link-up event. At step 1108, if a MAC is found in the MAC address table, step 1110 is performed. Otherwise, step 1112 is performed. At step 1112, controller 118 waits for a physical device to send an information packet that includes a MAC address corresponding to the NIC of the physical device.

At step 1110, controller 118 matches the MAC with a server configuration stored in controller database 502. At step 1114, if a server configuration matches the MAC in the MAC address table, step 1116 is performed. Otherwise, step 1112 is performed. At step 1116, controller 118 checks if a physical device is in the port. At step 1118, if a physical device is in the port, step 1120 is performed. Otherwise, step 1122 is performed.

At step 1120, controller 118 checks whether the physical device in the port reporting the link-up event is the same as the physical device with the matching configuration. If it is, step 1124 is performed. Otherwise, step 1126 is performed. At step 1124, controller 118 retains the physical device in the port reporting the link-up event. At step 1126, controller 118 removes the physical device from the port reporting the link-up event. At step 1122, controller 118 moves the physical device with the configuration matching the MAC found in the MAC address table into the port reporting the link-up event.

At step 1112, controller 118 waits for a physical device to send an information packet, which includes a MAC address corresponding to the NIC of the physical device. Since a MAC in the MAC address table does not match a server configuration, the physical device requires booting from a local disk boot or a NAS device. This is determined by a method for discovering a physical device as described below.

Figure 12A:
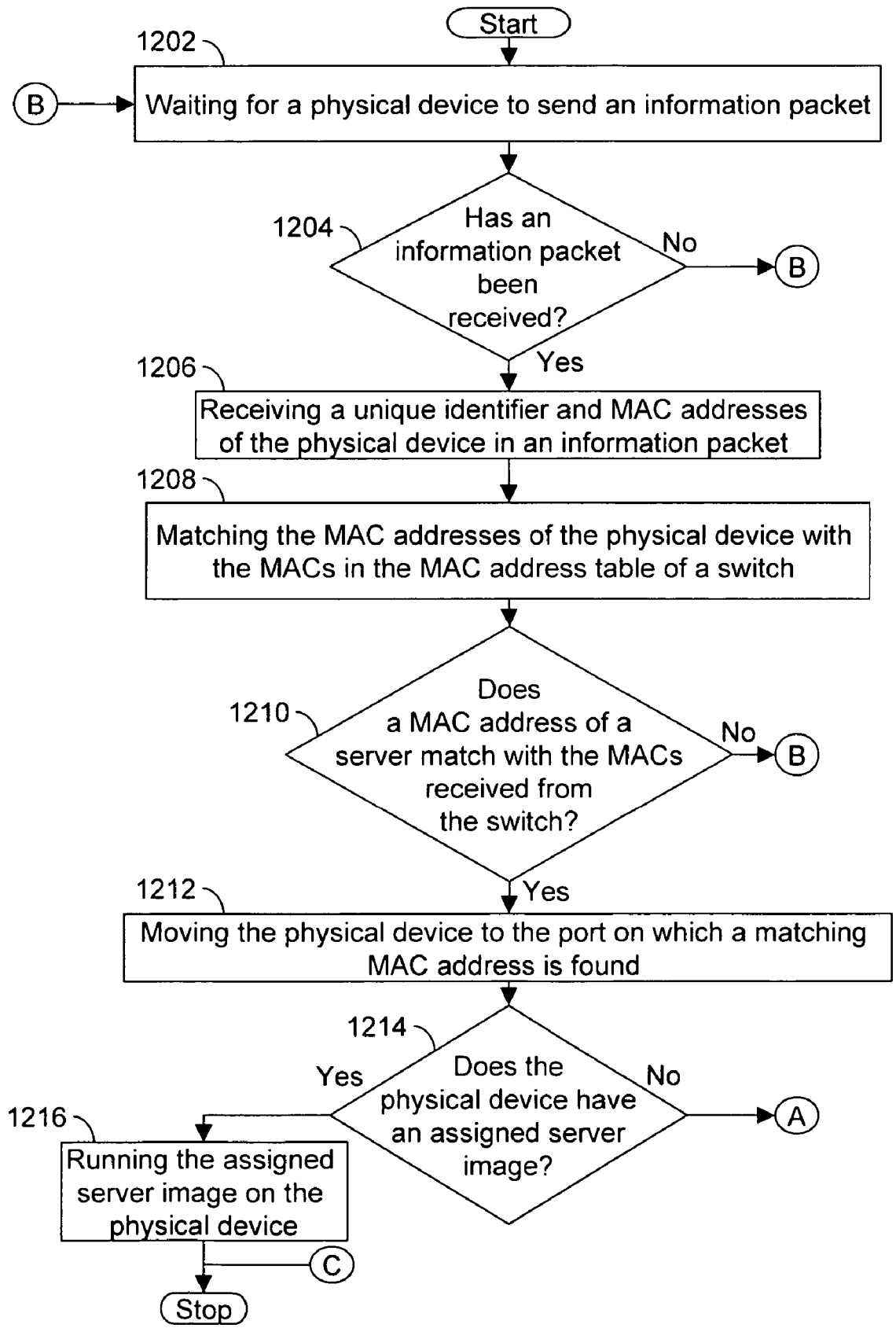
FIGS. 12A and 12B represent a flowchart depicting a method for discovering a server, in accordance with an embodiment of the invention.
Figure 12B:
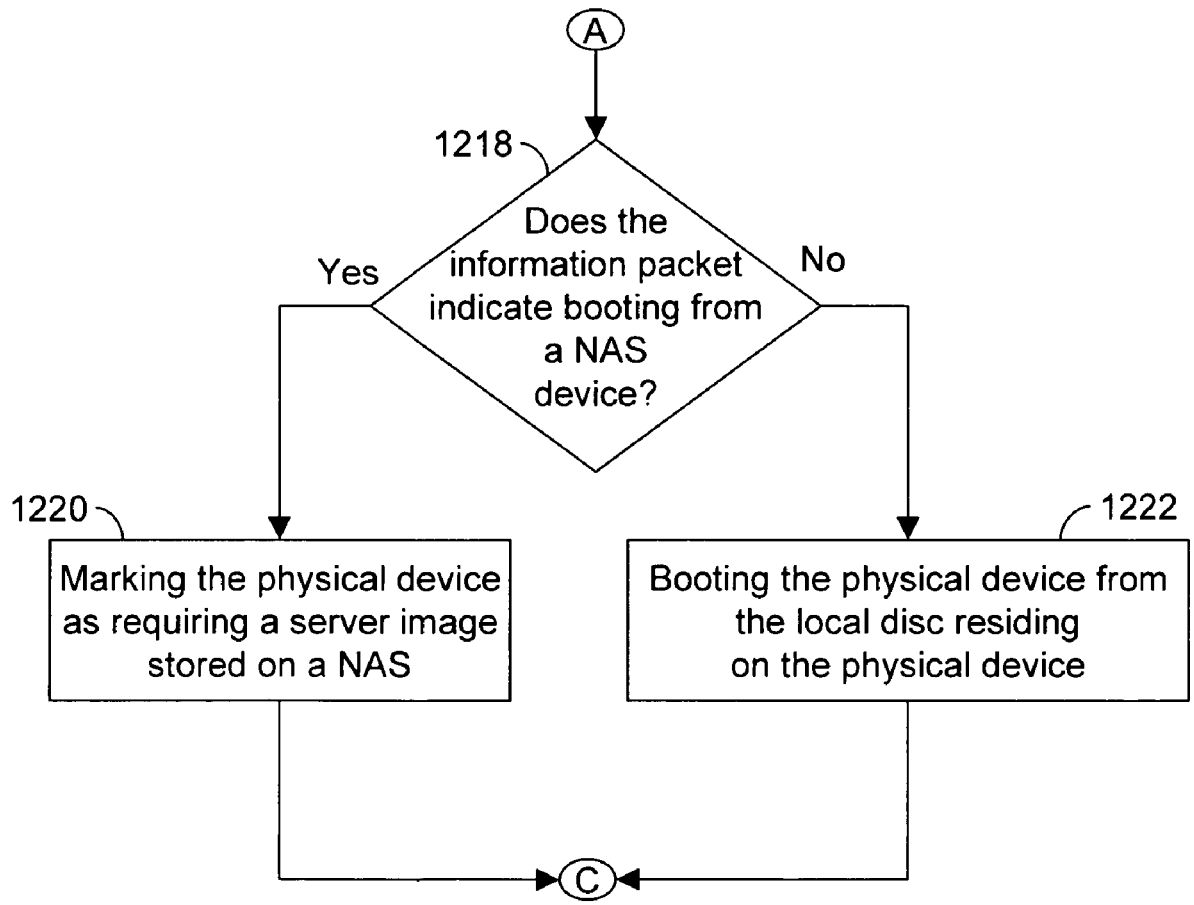

FIGS. 12A and 12B represent a flowchart depicting the method for discovering a physical device, in accordance with an embodiment of the invention. At step 1202, controller 118 waits to receive an information packet that is to be sent by a physical device. If an information packet is received by controller 118 at step 1204, step 1206 is performed. Otherwise, step 1202 is performed.

At step 1206, controller 118 receives a unique server identifier and the MAC addresses of the physical device in the information packet. At step 1208, controller 118 matches the MAC addresses of the physical device with the MACs in the MAC address table of switches 124. At step 1210, if the MAC address of the physical device matches the MACs received from switches 124, step 1212 is performed. Otherwise, step 1202 is performed.

At step 1212, controller 118 moves the physical device to the port on which a matching MAC address is found. At step 1214, controller 118 checks whether the physical device has an assigned server image. If the physical device has an assigned server image, step 1216 is executed. Otherwise, step 1218 is executed. At step 1216, the physical device boots by using the assigned server image.

At step 1218, controller 118 checks whether the information packet indicates that there is booting from a NAS device. If the information packet indicates that there is booting from a NAS device, step 1220 is performed. Otherwise, step 1222 is performed. At step 1220, controller 118 marks the physical device, indicating that it requires a server image stored on a NAS device. At step 1222, controller 118 directs the physical device to boot from a local disk present on physical device.

Figure 13A:
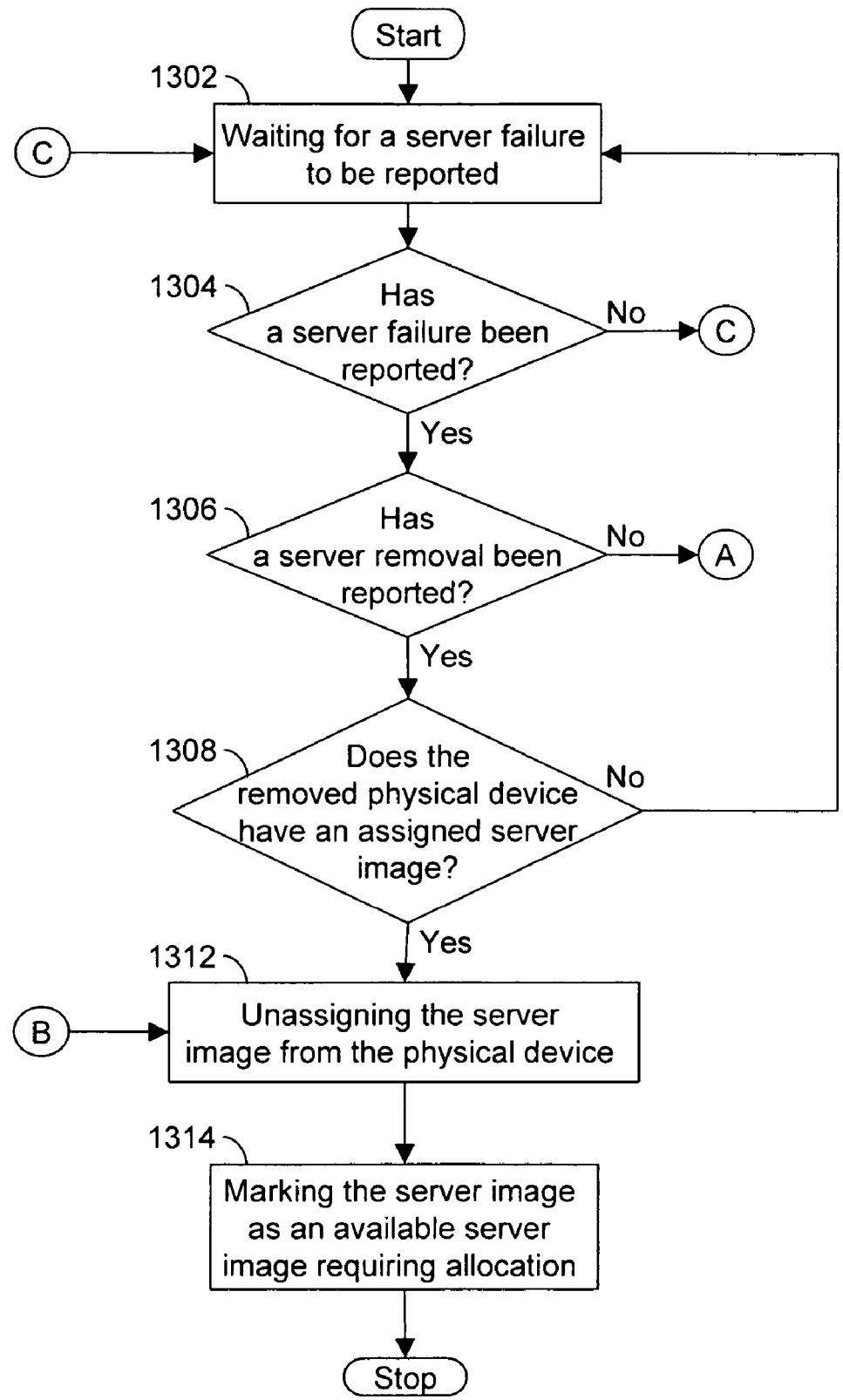
FIGS. 13A and 13B represent a flowchart depicting a method for providing a substitute server, when a server impairment or a server failure is reported, in accordance with an embodiment of the invention.
Figure 13B:
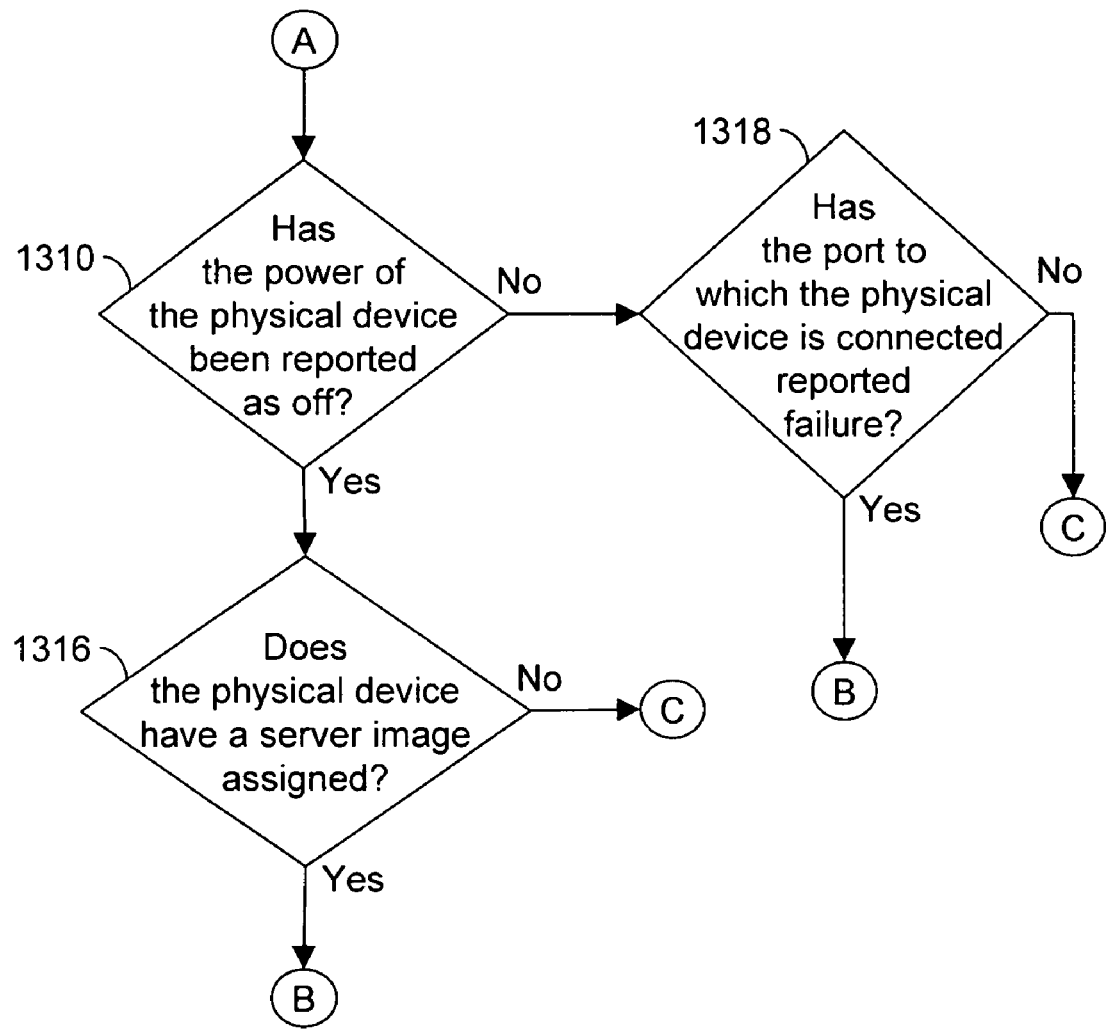

FIGS. 13A and 13B represent a flowchart depicting a method for providing a substitute physical device when a server impairment or server failure is reported, in accordance with an embodiment of the invention. A physical device may report impairment or failure. Server impairment is reported when a physical device fails to perform its functions and reports an erroneous operational state. Server failure is reported when a physical device fails to report its status periodically. At step 1302, controller 118 waits for a server failure to be reported. If a server failure has been reported at step 1304, step 1306 is executed. Otherwise, step 1302 is performed. If a server removal has been reported at step 1306, step 1308 is performed. Otherwise, step 1310 is performed. If physical device has an assigned server image at step 1308, step 1312 is performed. Otherwise, step 1302 is performed.

At step 1312, controller 118 unassigns the server image from the physical device. At step 1314 controller 118 marks the server image that has been unassigned as an available server image requiring allocation. At step 1310, controller 118 checks the status of power of the physical device reporting the server failure. If the status of power of the physical device reporting the server failure has been reported as off, step 1316 is performed. Otherwise, step 1318 is performed. If the physical device has a server image assigned at step 1316, step 1312 is performed. Otherwise, step 1302 is performed. If the status of the port connected to the physical device that reports the failure has been reported as down at step 1318, step 1312 is performed. Otherwise, step 1302 is performed.

The present invention decouples the software identities from the hardware of a physical device. Thus, it enables dynamic allocation of server images to the physical devices.

The present invention also reduces the degree of manual intervention required on the part of the data center administrator. The data center administrator is only required to make policy-level decisions and define the overall functional design of the Data Center System (DCS).

In the event of a server failure, the present invention is capable of dynamically providing a suitable substitute physical device. Therefore, the present invention increases the availability of a DCS and reduces the delay in services.

The present invention enables transparent allocation of server images, since the same image can be run on different types of machines. For example, a persona on an 'ABC' machine can be assigned to an 'XYZ' machine if the ABC machine fails. The dynamic allocation is carried out without any manual intervention by the DCS administrator. This adds to the transparency attribute of the VDC system.

The invention further decouples the storage system related hardware identities from the hardware. Therefore, it reduces the amount of disruption in services if hardware such as a NIC or an HBA on the system is changed or replaced, or a server function is transferred from one physical device to another.

While the preferred embodiments of the invention have been illustrated and described, it will be clear that the invention is not limited only to these embodiments. Numerous modifications, changes, variations, substitutions and equivalents will be apparent to those skilled in the art, without departing from the spirit and scope of the invention, as described in the claims.

What is claimed is:

1. A virtual data center system, the virtual data center system comprising a plurality of virtual server racks, each virtual server rack of the plurality of virtual server racks comprising a plurality of physical servers and a plurality of layer 2 switches, each of the plurality of layer 2 switches comprising a plurality of ports, each physical server is connected to at least one of the ports on the plurality of layer 2 switches, each physical server requiring remote management for booting a server image enabling booting of the physical server, the server image after being booted on the physical server, requiring network related configuration for accessing the communication and storage access networks, the virtual data center system comprising:

a. a plurality of communication networks, wherein at least one layer 2 switch of each of the plurality of virtual server racks is connected to at least one communication network, wherein the at least one communication network is a layer 2 interconnect fabric;

b. a plurality of storage access networks, wherein each physical server is connected to at least one of the plurality of storage access networks;

c. a plurality of storage systems, wherein each storage system is connected to at least one of the plurality of storage access networks wherein each storage system comprising a plurality of server images;

d. a controller, the controller comprising a controller database, the controller database providing storage facilities to store a plurality of abstracted server images, wherein an abstracted server image comprising location of a server image on the storage system, network related attributes and storage access related attributes, wherein the network related attributes and the storage access related attributes are required by a physical server to communicate with the storage system to boot using the server image the controller dynamically configuring and assigning the abstracted server image, the abstracted server image being assigned to the physical server;

e. an agent, the agent residing on each physical server of the plurality of physical server, the agent enabling communication between the physical server and the controller; and f. a system management infrastructure, the system management infrastructure comprising communication networks, wherein at least one of the communication networks connects the controller with remote management interfaces of each of the plurality of physical servers to remotely power on and power off the plurality of physical servers, wherein the communication network further connects the controller with remote management interfaces of each of the plurality of layer 2 switches to configure the plurality of layer 2 switches to connect to the plurality of communication networks.

2. The virtual data center system of claim 1 further comprising a console, the console providing an interface to a data center administrator to communicate with the controller.

3. The virtual data center system of claim 2, wherein the console further comprising a graphical tool, the graphical tool enabling the data center administrator to specify the overall functional design of the virtual data center system.

4. The virtual data center system of claim 1 further comprising a plurality of appliances, each appliance of the plurality of appliances comprising a remote management interface wherein each appliance is connected to the system management infrastructure.

5. The virtual data center system of claim 4, wherein each appliance of the plurality of appliances is connected to at least one of the communication networks.

6. The virtual data center system of claim 1, wherein the virtual server rack of the plurality of virtual server racks is a physical server of the plurality of physical servers, wherein the physical server comprising a server virtualization operating system, the server virtualization operating system comprising a plurality of virtual machines and a remote management interface, wherein the remote management interface remotely controlling power on and power off of the plurality of virtual machines and configuring the server virtualization operating system, wherein each virtual machine of the plurality of virtual machines requires a server image for booting.

7. The virtual data center system of claim 1, wherein the storage system is selected from a group consisting of a local disk, a Storage Area Network (SAN), and a Network Attached Storage (NAS) device.

8. The virtual data center of claim 1, wherein the virtual server rack of the plurality of virtual server racks is a server chassis, the server chassis comprising a remote management interface to communicate with the plurality of physical servers and the plurality of layer 2 switches, wherein the chassis further comprising an internal communication system, the internal communication system connecting each physical server of the plurality of physical servers to each layer 2 switch of the plurality of layer 2 switches.

9. A method for managing a virtual data center system, the virtual data center system comprising a plurality of virtual server racks, each virtual server rack comprising a plurality of physical servers and a plurality of layer 2 switches, each of the plurality of layer 2 switches comprising a plurality of ports, each physical server being connected to at least one of the ports on the plurality of layer 2 switches, at least one of the plurality of layer 2 switches being connected to at least one of a plurality of communication networks, one of the plurality of communication networks being a layer 2 interconnect fabric, each physical server requiring remote power management for booting, a server image enabling booting of the physical server, the server image after being booted on the physical server, requiring network related configuration for accessing the storage access and communication networks, the server image being stored on a storage system of a storage access network, the virtual data center system further comprising a controller, the controller comprising a controller database, the method comprising the steps of:

a. configuring the server image, the server image being configured dynamically by the controller, the server image being requested by a physical server of the plurality of physical servers for booting, wherein configuring the server image comprising abstracting the server image by storing location of the server image on the storage system, network related attributes and storage access related attributes, wherein the network related attributes and the storage access related attributes are required by a physical server to communicate with the storage system and the plurality of communication networks to boot using the server image, wherein the attributes are stored in the controller database;

b. assigning an abstracted server image to a physical server, wherein the abstracted server image is assigned by the controller;

c. booting the physical server of the plurality of physical servers with the server image using the abstracted server image, wherein the abstracted server image is assigned to the physical server by the controller; and d. discovering a physical server in a virtual server rack of the plurality of virtual server racks, wherein discovering the physical server includes identifying a port of the plurality of ports of the plurality of layer 2 switches to which the physical server is connected.

10. The method of claim 9 further comprising the step of tracking the movement of the physical server across the plurality of ports of the plurality of layer 2 switches of the plurality of virtual server racks.

11. The method of claim 10, wherein tracking the movement of the physical server across the plurality of ports of the plurality of layer 2 switches comprising the steps of:

a. waiting for a link-up event to be reported at one of the plurality of ports of the plurality of layer 2 switches;

b. getting a MAC address table from a layer 2 switch of the plurality of layer 2 switches for a port, the port reporting the link-up event;

c. matching a MAC address with a server configuration, wherein the MAC address is found in a MAC address table of the layer 2 switch, the server configuration being stored in a configuration database in the controller database;

d. checking whether a physical server is connected to the port, reporting the link-up event, when the server configuration matches with the MAC address in the MAC address table;

e. retaining the physical server in the port, when the physical server is connected to the port is same as a physical server with the matching server configuration;

f. removing the physical server from the port reporting the link-up event; and g. moving the physical server of the matching server configuration into the port reporting the link-up event, the physical server having the server configuration matching with the MAC address, the MAC being found in the MAC address table.

12. The method of claim 9 further comprising the step of providing a substitute physical server, the physical substitute server being provided when at least one of server impairment and server failure is reported, the server impairment being reported when a physical server of the plurality of physical servers fails to perform its functions and reports erroneous operational state, the server failure being reported when a physical server of the plurality of physical servers fails to report its status periodically.

13. The method of claim 12, wherein providing the substitute physical server comprising the steps of:

a. waiting for a physical server failure to be reported;

b. unassigning the abstracted server image from the physical server, the server reporting server failure;

c. marking the abstracted server image as an available abstracted server image, the available abstracted server image requiring assignment; and d. checking whether power of the physical server reporting server failure has been reported off.

14. The method of claim 9, wherein configuring the abstracted server image further comprising the steps of assigning a unique server image identifier to the abstracted server image.

15. The method of claim 9, wherein assigning the abstracted server image to the physical server comprising the steps of:

a. waiting for at least one of the physical server to be available and the abstracted server image to make a request, the physical server being available when the physical server does not have any assigned abstracted server image, the request being made by the abstracted server image for being assigned to the physical server;

b. checking whether a server image requires allocation when at least one of the physical server is available and the abstracted server image requires allocation;

c. checking whether the server image is locked for a particular physical server of the plurality physical servers when the server image requires allocation d. booting the physical server with the locked server image when the server image is locked for the physical server, wherein the locked server image is stored in the storage system of the storage access network;

e. checking a list of available physical servers of the plurality physical servers when the server image requires booting from the storage system, wherein the available physical servers support booting from the storage system;

f. matching attributes associated with the available physical servers with the attributes associated with the abstracted server image of the server image;

g. assigning the abstracted server image to a physical server of the list of available physical servers when the attributes associated with the abstracted server image match with the attributes associated with the physical server of the list of available servers; and h. booting the physical server with the server image on the storage system using the assigned abstracted server image.

16. The method of claim 9, wherein booting the physical server comprising the steps of:

a. broadcasting a request for a server image, the request being broadcasted by the physical server to the controller, the request being made using installed Network Interface Cards (NICs), the NICs being installed on the physical server broadcasting the request;

b. assigning a default pre-boot image, the default pre-boot image being assigned by the controller to the physical server broadcasting the request;

c. downloading the pre-boot image, the pre-boot image being downloaded by the physical server;

d. running the pre-boot image;

e. sending a unique server identifier of the physical server and Medium Access Control (MAC) addresses of the installed NICs, the unique server identifier of the server and MAC addresses being sent by the physical server to the controller f. checking for an abstracted server image assigned to the physical server, wherein checking the abstracted server image comprising checking the location of a server image on the storage system, the checking being performed by the controller;

g. booting the physical server with the server image using the assigned abstracted server image when the storage system is a local disk present on the physical server;

h. sending a virtual World Wide Name (WWN) to the physical server when the storage system is a Storage Area Network (SAN), the virtual WWN being sent by the controller to the physical server, the virtual WWN being used by the physical server to establish a connection with the SAN;

i. establishing a connection with the server image on the SAN, the connection being established by the physical server, the connection allowing access to the server image;

j. running the server image on the physical server, wherein the server image is stored on the SAN;

k. running the pre-boot image, the pre-boot image being run by the physical server, the pre-boot image residing on the physical server;

l. establishing a communication path between the physical server and a Network Attached Storage (NAS) device, the communication path being established using a virtual MAC address m. downloading the server image from the NAS device, the downloading being done by the physical server; and n. running the downloaded server image.

17. The method of claim 9, wherein discovering the physical server in the virtual server rack comprising the steps of:

a. waiting for an information packet to be received, the information packet being sent by the physical server;

b. receiving a unique server identifier and MAC addresses of the physical server, the unique server identifier and the MAC addresses of the physical server being present in the information packet;

c. matching the MAC addresses of the physical server with MACs addresses in the MAC address table of a layer 2 switch, wherein the layer 2 switch includes the port providing connectivity to the physical server;

d. moving the physical server into the port on which a matching MAC address is found when a MAC address of the MAC addresses of the physical server matches with the MAC addresses in the MAC address table received from the layer 2 switch;

e. marking the physical server as requiring a server image when the information packet indicates booting from the server image on the storage system of the storage access network; and f. booting the physical server with the server image on the storage system using the assigned abstracted server image, wherein the storage system is at least one of a local disk present on the physical server, a storage access network (SAN) and a Network Attached Storage (NAS).

* * * * *